United States Patent [19]
Walser

[11] Patent Number: 5,261,856
[45] Date of Patent: Nov. 16, 1993

[54] AIR PRESSURE VENT SYSTEM FOR A VEHICLE PASSENGER SPACE

[75] Inventor: Anthony R. Walser, Westland, Mich.

[73] Assignee: Ford Motor Company, Dearborn, Mich.

[21] Appl. No.: 990,676

[22] Filed: Dec. 14, 1992

[51] Int. Cl.⁵ .............................................. B60H 1/26
[52] U.S. Cl. .................................... 454/139; 454/145; 454/162
[58] Field of Search ................. 454/70, 139, 141, 142, 454/143, 145, 148, 156, 159, 162

[56] References Cited

U.S. PATENT DOCUMENTS

| | | |
|---|---|---|
| 3,448,674 | 6/1969 | Southors et al. ............... 454/159 X |
| 3,590,858 | 7/1971 | Martin . |
| 3,911,801 | 10/1975 | Stolz . |
| 3,993,096 | 11/1976 | Wilson . |
| 4,691,623 | 9/1987 | Mizusawa . |
| 4,834,170 | 5/1989 | Sakurada et al. . |
| 4,969,485 | 11/1990 | Ball et al. . |
| 4,972,765 | 11/1990 | Dixon . |

FOREIGN PATENT DOCUMENTS

| | | | |
|---|---|---|---|
| 214407 | 12/1983 | Japan ..................................... | 454/75 |
| 81213 | 5/1984 | Japan .................................... | 454/162 |

*Primary Examiner*—Harold Joyce
*Attorney, Agent, or Firm*—Daniel M. Stock; Roger L. May

[57] ABSTRACT

An air circulation device for moving air within an automotive vehicle passenger compartment having a temperature conditioning system, a blower, and an intake air circulation duct, the intake air circulation duct having walls which are pierced by an outlet orifice, a first intake orifice, and a second intake orifice, the first and second intake orifices being selectively sealed by a primary valve assembly containing one or more directional flow control valves through which interior passenger compartment air may flow via the first intake orifice to the outside, thereby relieving unwanted positive air pressure within the passenger compartment.

12 Claims, 2 Drawing Sheets

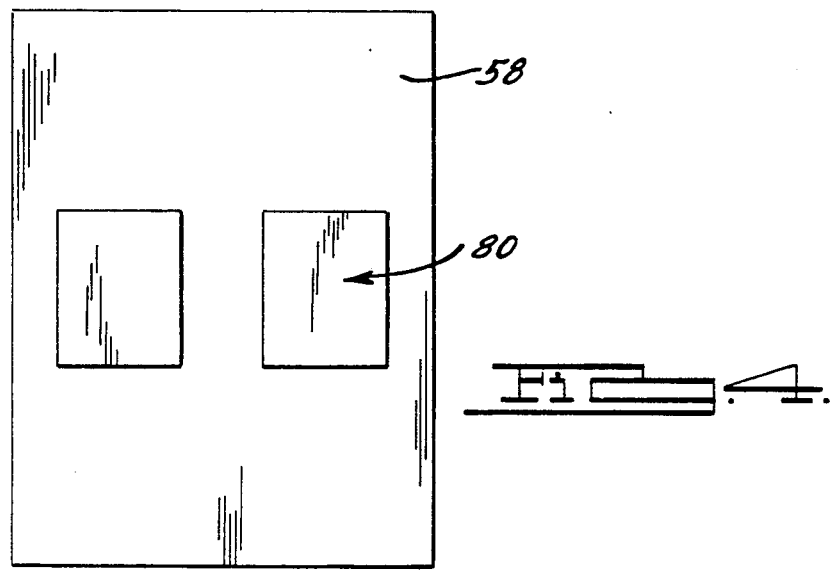
Fig. 4.
Fig. 5.
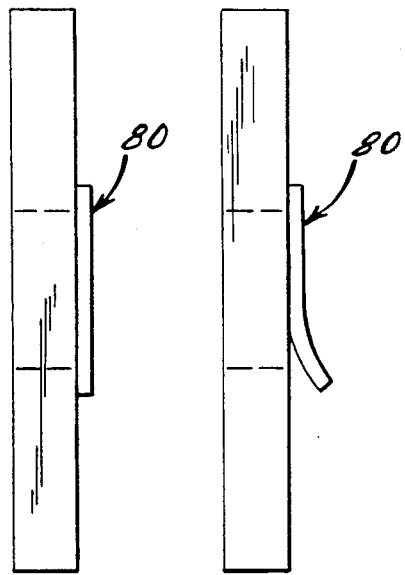
Fig. 6.
Fig. 7.
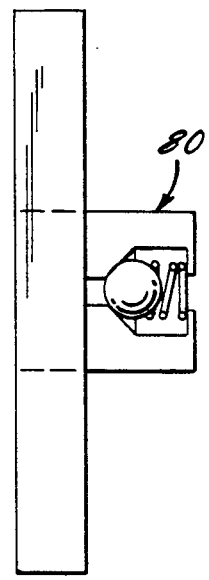
Fig. 8.
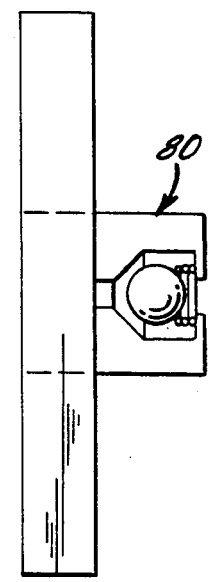

AIR PRESSURE VENT SYSTEM FOR A VEHICLE PASSENGER SPACE

BACKGROUND OF THE INVENTION

1. Field of the Invention

This invention relates to systems which vent positive air pressures, particularly within an air conditioned vehicle passenger space.

2. Description of Related Art

It is known that internal vehicle passenger compartment air pressure often becomes greater than the air pressure external to the vehicle i e., a positive air pressure differential is created with respect to the atmosphere. Vehicles with air conditioning units are especially prone to this condition. Their air conditioning units are typically sealed against sources of hot external air and consequently the passenger compartment becomes relatively air tight. When a passenger attempts to close a passenger door, air pressure is created when the door is moved into sealing engagement with the vehicle body, inhibiting easy closure of that door. This can result in an inconvenient situation for the occupant. The occupant often reopens the door and closes it with increased effort. Venting the vehicle interior to the outside relieves the positive air pressure and allows the doors to be closed easily.

In the past, others have vented the passenger compartment by supplying additional air ventilation devices and pathways. These additional ventilation devices have typically been located either in the door structure or in the vehicle body structure. U.S. Pat. No. 4,691,623 to Mizusawa discloses a multicomponent valving device that is installed in a matching aperture punched into the vehicle's "B" pillar A second aperture is punched into an interior wall of the vehicle to allow the vehicle passenger compartment to communicate with outside air via the venting device. Although the addition of this or a similar device to the body structure resolves the difficulty in closing the passenger door, economic issues arise.

Manufacturing costs increase greatly when venting devices and air pathways are added to the basic body structure. Expensive new tooling is required for punching additional apertures into the body structure to accommodate the ventilation devices. More time and personnel are needed to assemble and install these multicomponent devices. Additional material is needed for the manufacture of individual components. In addition to these manufacturing costs, punched holes in the metal body parts increase the opportunity for moisture to attack and corrode the body structure.

It is desirable to vent the interior passenger space of a vehicle without introducing new apertured features to the body structure. Such venting is particularly suitable if it makes use of existing vehicle componentry without accruing significant investment or material costs. The use of existing assembly processes further enhances the desirability of such a venting device.

SUMMARY OF THE INVENTION

Responsive to deficiencies in the prior art the present invention provides a system for venting positive air pressure from the passenger compartment of a motor vehicle. The inventive system makes use of an air circulating device for an automobile passenger compartment of the type having means for temperature conditioning air which passes through it into the passenger compartment, means for blowing air unidirectionally through the temperature conditioning means, an intake air duct in fluid communication with the blowing means via a flow port and directing the flow of air either from a source outside the vehicle through a first intake orifice or from a source inside the vehicle through a second intake orifice, which is proximate to the first intake orifice, and a system for venting positive air pressure within the passenger compartment, comprising a valve element, which is moveably mounted within the intake air duct to sealingly engage either of the intake orifices through selective positioning thereof, and at least one directional flow control valve, which is carried with the valve element and allows reversed flow therethrough to relieve positive air pressure within the passenger compartment. The directional flow control valve is actuated when the passenger compartment air pressure reaches a predetermined positive difference from the air pressure outside the vehicle. Air will not pass through the directional flow control valve if the air pressure difference is less than the predetermined value.

Several advantages are realized when positive air pressures are vented using the present invention Because the system for venting positive air pressure within the passenger compartment is integrated into existing vehicle air circulating equipment, there is no need to alter the vehicle body structure; no apertures are needed to install other venting. Tooling costs are avoided and the metal body structure is spared new avenues of corrosion.

BRIEF DESCRIPTION OF THE DRAWINGS

FIG. 4 is a frontal view of the valve element with two integral directional flow control valves.

FIG. 5 is a side view of the valve element with no activation of a flapper type directional flow control valve.

FIG. 6 is a side view of the valve element with an activated flapper type directional flow control valve.

FIG. 7 is a side view of the valve element with no activation of a ball-check type directional flow control valve.

FIG. 8 is a side view of the valve element with an activated ball-check type directional flow control valve.

DETAILED DESCRIPTION OF THE PREFERRED EMBODIMENT

Figure 1:
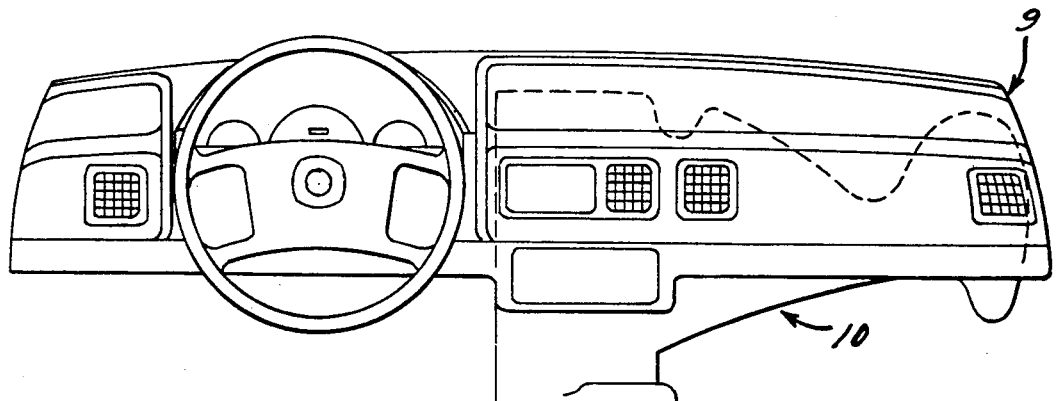
FIG. 1 is a schematic illustration showing an air circulating device mounted beneath the instrument panel of an automotive vehicle.

Referring now to FIG. 1, an air circulating device 10 is provided for an automotive vehicle and disposed beneath an instrument panel 9 within the vehicle interior. The air circulation device 10 may extend laterally from near the longitudinal midline of the vehicle, and away from the driver's position Turning to FIG. 2, the air circulating device 10 is illustrated as being powered by a conventional electric motor 12 which drives a cylindrical squirrel cage blower 14. The blower 14 is sealingly housed within a tubular casing 16 which is concentric with the squirrel cage blower 14 and defines an air passageway 18 to direct the flow of air from the blower. The casing 16 has a back wall 20 through which a drive shaft 22 extends axially through the center, a face wall 24 which has an axially concentric inlet port 26, and a tube wall 28 which has a rectangular outlet port 30. The blower 14 moves air through the casing 16 by drawing air in through the inlet port 26 and pushing it out through the outlet port 30 into an adjoining duct 32 which houses a means for temperature conditioning the flowing air, including known heat exchangers 36, 38. The rectangular shape of the outlet port 30, and the circular shape of the inlet port, have been found acceptable, although other shapes are possible.

The adjoining duct 32 defines an air path 34 in fluid communication at one end with the air passageway 18 of the casing 16. Air flows along the air path 34, through the first heat exchanger 36 which when activated cools the passing air, the second heat exchanger 38 which when activated heats the passing air, into the passenger compartment 40 of the vehicle through an exit port 41. The arrows 42 in FIG. 2 indicate the air flow direction that results from the operation of the squirrel cage blower 14. It is contemplated that the casing 16 and the adjoining duct 32 may be constructed as a single molded plastic unit. However, if function or assembly is enhanced, both the casing 16 and the adjoining duct 32 can be assembled as multiple components sealed against air leakages at the component interfaces by conventional gasketing and fastened together with conventional means.

An intake air duct 44 is securely fastened to the casing 16 with conventional means and the interface therebetween is sealed with conventional gaskets. The design of the intake air duct 44 should optimize the efficiency of the air flow and as such its geometry is discretionary, typically employing a plurality of vertical, horizontal, and/or arcuate walls 48. The walls 48 of the intake air duct 44 include a first intake orifice 50 through which air flows into the intake air duct 44 from a source 54 outside the vehicle, a second intake orifice 52 through which air flows into the intake air duct 44 from a source 40 inside the passenger compartment, and a blower orifice 56 through which air flows into the casing 16. The blower orifice 54 is generally in alignment with the inlet port 26 of the casing 16 which allows fluid communication between the intake air duct 44 and the blower 14.

Figure 3:
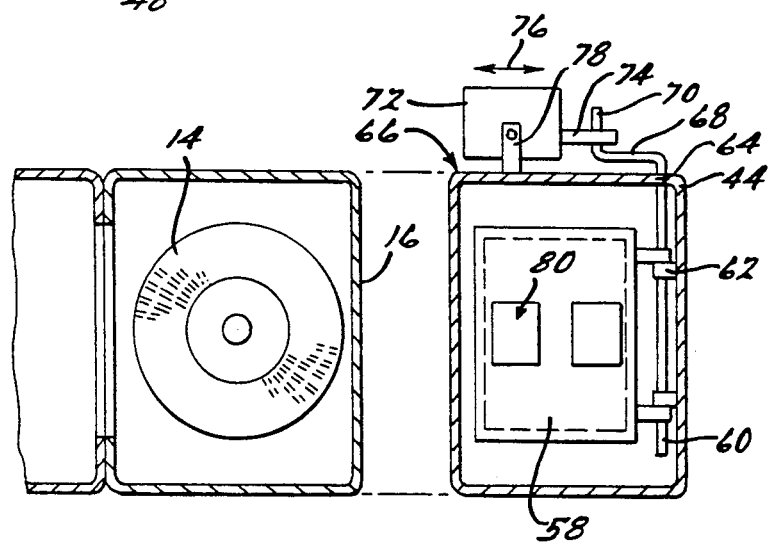
FIG. 3 is a front view of the air circulating device with specific elements featured.

Provided within the intake air duct 44 is a valve assembly 58 which is moveably mounted to sealingly engage either the first intake orifice 50 or the second intake orifice 52 through selective positioning, the second intake orifice 52 being proximately disposed to the first intake orifice 50. As may best be seen in FIG. 3, the movement of the valve assembly 58 is illustrated as being accomplished through a conventionally actuated hinged mechanism. The valve assembly 58 is fixedly secured on one side to an elongate cylindrical hinge pin 60 which extends vertically through hinge assemblies 62 attached to an inside surface of the intake air duct 44. The hinge pin 60 further extends vertically to outside the intake air duct 44, through a pin hole 64 sealed in a conventional manner and included in an upper wall 66 of the intake air duct 44. Outside the intake air duct 44 the hinge pin 60 is bent horizontally a short distance to form a crank arm 68 and is further bent vertically a short distance to form a crank pin 70. A conventional linear motor 72 drives a push bar 74 to oscillate in the direction of the arrows 76. The push bar 74 in turn drives the crank arm 68 causing pivotal movement of the valve assembly 58 inside the intake air duct 44. The linear motor 72 may be mounted to the outside surface of the upper wall 66 by a conventional bracket and hardware 78 or may be mounted conveniently somewhere separate from the air circulating device 10. Although a linear motor 72 is shown, the movement of the valve assembly 58 could be driven by manually actuated linkages or other known driving elements.

According to the invention as depicted in FIGS. 5-8 at least one directional flow control valve 80 is integrated into the valve assembly 58. The directional flow control valve 80 is a flapper type depicted in FIG. 5 and FIG. 6, although ball-check types, depicted in FIG. 7 and FIG. 8 or others can be used. When the valve assembly 58 is moved to be sealingly engaged with the first intake orifice 50, as shown by the solid in FIG. 2, the passenger compartment become substantially air tight. Closing the passenger door creates a positive air pressure condition within the passenger compartment 40; the inside air pressure being greater than the outside air pressure. The directional flow control valve 80 remains closed, FIG. 5 and FIG. 7, until the positive air pressure reaches a predetermined level known to inhibit easily closing the passenger door. Once the predetermined level is reached, the differential pressure across the valve effects movement and the directional flow control valve effects 80 opens, FIG. 6 and FIG. 8, allowing internal passenger compartment air to flow through the valve assembly 58 to the outside 54, thereby balancing the passenger compartment 40 air pressure with the outside 54 air pressure. The passenger door is now easily closed.

Figure 2:
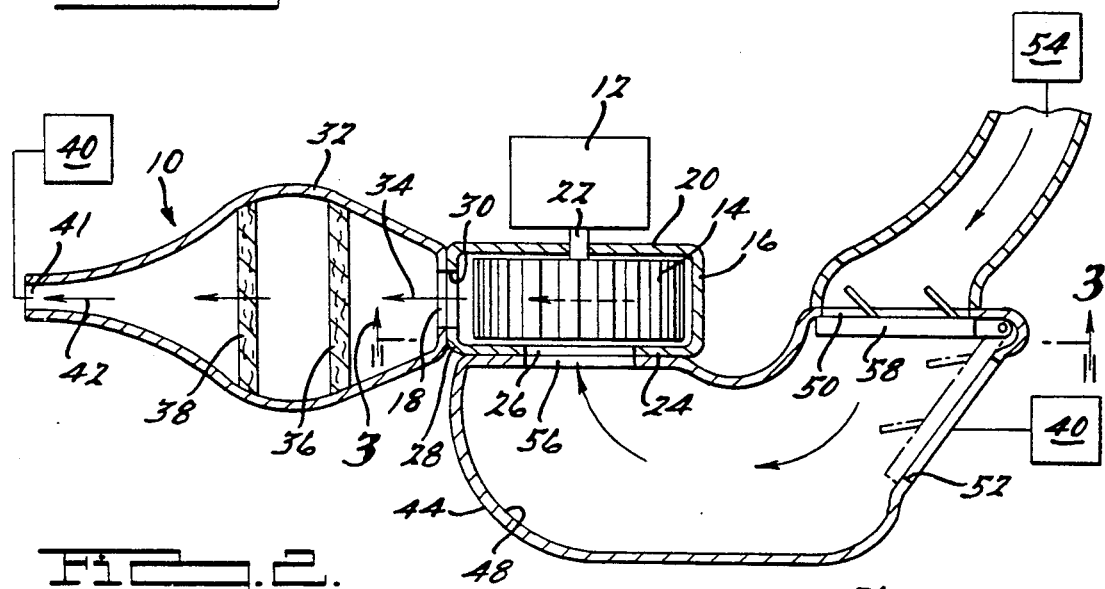
FIG. 2 is a plan view cross section of the air circulating device.

The directional flow control valve 80 does not function when the valve assembly 58 is sealingly engaged with the second intake orifice 52, shown as the dotted lines in FIG. 2. Positive air pressure differences do not occur across the valve assembly 58 because air can flow directly to the outside 54 in reverse flow direction 42 through the air Path 34, and the air passageway 18.

In light of the above teachings, persons skilled in the art will recognize that many changes and modifications can be made to the above described embodiment without straying from the scope of the present invention.

What is claimed is:

1. A venting system for venting positive pressure from the passenger compartment of an automotive vehicle to the vehicle exterior, the vehicle being of the type including an air circulating device having an inlet duct in fluid communication at its inlet with the vehicle exterior and at its outlet with a blower operative to deliver air to the passenger compartment, the system comprising:

valve means mounted in said inlet duct and selectively operable between a first operative condition in which fluid communication with said vehicle exterior is blocked and a second operative condition in which fluid communication with said vehicle exterior is permitted; and directional flow control valve means operative Lo permit air flow from said inlet duct to said vehicle exterior when said valve means is in said first operative position.

2. A venting system as defined in claim 1 wherein said inlet duct comprises a first intake orifice effecting fluid communication with said vehicle exterior and a second intake orifice positioned proximate said first intake orifice effecting fluid communication with said passenger compartment and said valve means comprises a single valve element operatively movable between first and second positions corresponding to said first and second operative conditions of said valve means.

3. A venting system as defined in claim 2 wherein said directional flow control valve means is further operative to prevent air flow directly from said inlet duct to said passenger compartment when said valve means is in said second operative condition.

4. A venting system as defined in claim 1 wherein said directional flow control valve means is mounted on said valve element and is operative to control air flow therethrough.

5. A venting system as defined in claim 1 wherein said directional flow control valve means comprises flapper type valve means.

6. A venting system as defined in claim 1 wherein said directional flow control valve means comprises ball check valve means.

7. A venting system as defined in claim 3 wherein said single valve element is hingedly mounted within said intake duct intermediate said first and second intake orifices.

8. A venting system for venting positive pressure from the passenger compartment of an automotive vehicle to the vehicle exterior, the vehicle being of the type including an air circulating device having an inlet duct in fluid communication at its inlet with the vehicle exterior and at its outlet with a blower operative to deliver air to the passenger compartment, the system comprising:

valve means pivotally mounted in said inlet duct and selectively operable between a first operative condition in which fluid communication with said vehicle exterior is blocked and a second operative condition in which fluid communication with said vehicle exterior is permitted; and directional flow control valve means carried with said pivotally mounted valve means and operative to permit air flow from said inlet duct to said vehicle exterior when said valve means is in said first operative position.

9. A venting system as defined in claim 8 wherein said inlet duct comprises a first intake orifice effecting fluid communication with said vehicle exterior and a second intake orifice positioned proximate said first intake orifice effecting fluid communication with said passenger compartment and said valve means comprises a door pivotally movable between first and second positions corresponding to said first and second operative conditions of said valve means.

10. A venting system as defined in claim 9 wherein said directional flow control valve means is further operative to prevent air flow directly from said inlet duct to said passenger compartment when said valve means is in said second operative condition.

11. A venting system as defined in claim 8 wherein said directional flow control valve means comprises flapper type valve means.

12. A venting system as defined in claim 8 wherein said directional flow control valve means comprises ball check valve means.

* * * * *